O. KLUGE.
VERTICAL CUTTER ATTACHMENT FOR MOWING MACHINES.
APPLICATION FILED NOV. 7, 1911.
1,015,806.
Patented Jan. 30, 1912.
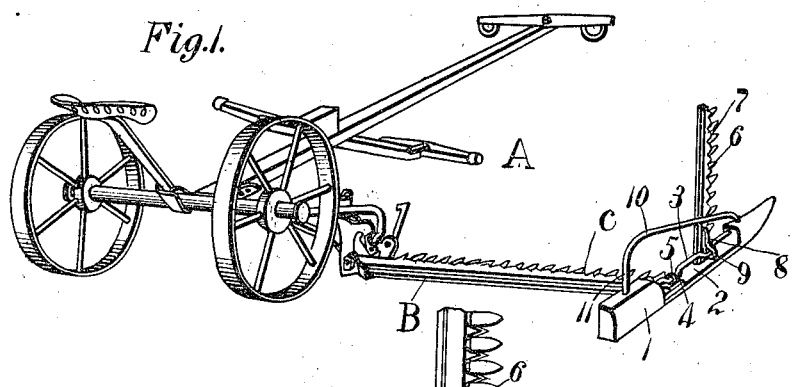
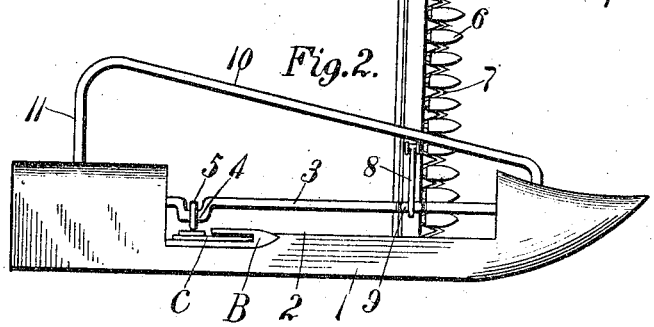
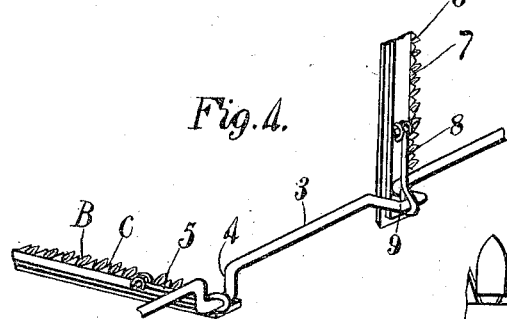
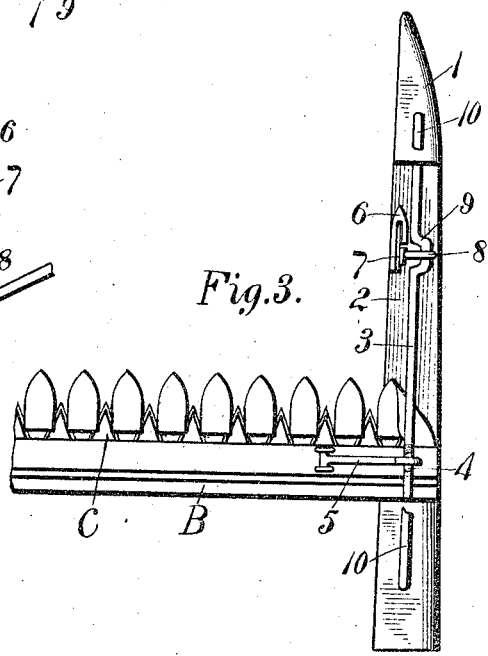

UNITED STATES PATENT OFFICE.

OTTO KLUGE, OF GOLCONDA, ILLINOIS.

VERTICAL CUTTER ATTACHMENT FOR MOWING-MACHINES.

1,015,806. Specification of Letters Patent. Patented Jan. 30, 1912.

Application filed November 7, 1911. Serial No. 659,050.

*To all whom it may concern:*

Be it known that I, OTTO KLUGE, a citizen of the United States, residing at Golconda, in the county of Pope and State of Illinois, have invented a new and useful Vertical Cutter Attachment for Mowing-Machines, of which the following is a specification.

This invention relates to attachments for mowing machines, its principal object being to provide a vertical cutter such as used in harvesting pea vines and the like, such cutter being so disposed as to sever the vegetable growths directly in the path of the shoe found at the end of the cutter bar of the mower, the various parts being so positioned as to prevent side draft thereon by the uncut vegetation.

A further object is to provide improved means for transmitting motion from the horizontal cutter bar to the vertical bar, the two bars moving in unison and the mechanism employed for transmitting motion from one to the other being positioned where it will not engage the uncut vegetation during the movement of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of a mowing machine having the present improvements applied thereto. Fig. 2 is an enlarged side elevation of the device constituting the present invention. Fig. 3 is a plan view of said attachment and of a portion of the cutter bar of the mowing machine. Fig. 4 is a perspective view showing the means for transmitting motion from one cutter bar to the other.

Referring to the figures by characters of reference A designates a mowing machine of any preferred type utilizing a finger bar B and a cutter bar C. As is usual in devices of this character, a shoe 1 is located at the outer end of the finger bar but in the present instance the finger bar and the cutter bar extend into a longitudinal recess 2 formed in the upper face of the shoe and extending forwardly from the cutter bar. In this recess is arranged a longitudinally extending shaft 3 having a crank 4 adjacent one end which is connected, by a pitman 5, to the reciprocating cutter bar C.

As shown particularly in Fig. 3 the inner side of the shoe 1 is straight from end to end and the cutter bar C does not extend beyond the outer side of the said shoe. Upstanding from the bottom of the recess 2 is a finger bar 6 the inner face of which is flush with the straight inner side of the shoe 1. A cutter bar 7 is mounted to reciprocate longitudinally of the finger bar 6 and the lower end thereof has a pitman 8 connected to it and to a crank 9 formed in the front portion of the shaft 3, said crank 9 being preferably disposed at 90 degrees to the crank 4.

A rod 10 is secured at its front end to the front end portion of the shoe 1 and extends upwardly and rearwardly above the recess 2, said rod terminating in a downwardly extending extremity 11 engaging the rear portion of the shoe. This rod serves as a shield to prevent vegetation from falling inwardly over the shoe and into engagement with the cutter bar. Importance is attached to the fact that the cutter bar 7 works in a path traveled by the pointed shoe 1 and it will thus be seen that as the machine is drawn forward, the shoe divides the vegetation in the path thereof and the same is then cut by the upstanding bar 7 so that, when the horizontal cutter bar C acts upon the vegetation in the path thereof, said vegetation will be completely severed and there will be no side draft on the machine. This result is due solely to the fact that cutter bar 7 works in front of the path of the end of the cutter bar C and above the space formed by the shoe 1. The simple means disclosed for transmitting motion from the cutter bar C to the cutter bar 7 results in the actuation of the two bars in unison, the bar C moving to the right during the upright movement of the bar 7 and moving to the left during the downward movement of said bar 7. It is understood of course that the shaft 3 does not rotate but merely rocks on its longitudinal axis.

What is claimed is:—

1. In a mowing machine, the combination with a horizontal finger bar and a cutter bar mounted for reciprocation thereon, of a longitudinally recessed shoe at the outer end of the finger bar, the corresponding end of the cutter bar working within the recess, said shoe having its inner side straight from end to end, a finger bar upstanding from the bottom of the recess and having its inner face flush with the straight inner side of the shoe, a cutter bar mounted for reciprocation upon said finger bar, a rock shaft extending longitudinally within the recess and having angularly disposed cranks, a pitman connection between one of the cranks and the upstanding cutter bar, and a pitman connection between the other crank and the horizontal cutter bar.

2. In a mowing machine the combination with a horizontal finger bar and a cutter bar mounted for reciprocation thereon, of a shoe at the outer end of said finger bar and having a longitudinal recess within which the end of the cutter bar is adapted to work, a rock shaft extending longitudinally within the recess and having spaced cranks disposed at angles to each other, the inner side of the shoe being straight from end to end, a finger bar upstanding from the bottom of the recess and having one face flush with the straight side of the shoe, a cutter bar mounted to reciprocate on the finger bar, a pitman connection between said cutter bar and one of the cranks, a pitman connection between the other cutter bar and the other crank, and a guard extending over and longitudinally of the recess and outside of the upstanding cutter bar.

In testimony that I claim the foregoing as my own, I have hereto affixed my signature in the presence of two witnesses.

OTTO KLUGE.

Witnesses:
W. A. WHITESIDE,
THOS. H. CLARK.